(12) United States Patent
Blades

(10) Patent No.: US 11,299,254 B2
(45) Date of Patent: Apr. 12, 2022

(54) SEAL PLATE FOR AN AERODYNAMIC SURFACE

(71) Applicant: AIRBUS OPERATIONS LIMITED, Bristol (GB)

(72) Inventor: Paul Blades, Bristol (GB)

(73) Assignee: Airbus Operations Limited, Bristol (GB)

( * ) Notice: Subject to any disclaimer, the term of this patent is extended or adjusted under 35 U.S.C. 154(b) by 636 days.

(21) Appl. No.: 16/223,431

(22) Filed: Dec. 18, 2018

(65) Prior Publication Data

US 2019/0193832 A1   Jun. 27, 2019

(30) Foreign Application Priority Data

Dec. 21, 2017   (GB) ...................................... 1721568
May 3, 2018     (GB) ...................................... 1807306

(51) Int. Cl.
*B64C 7/00*   (2006.01)
*B64C 9/02*   (2006.01)
(Continued)

(52) U.S. Cl.
CPC ................. *B64C 7/00* (2013.01); *B64C 3/14* (2013.01); *B64C 5/10* (2013.01); *B64C 9/02* (2013.01); *F16J 15/021* (2013.01)

(58) Field of Classification Search
CPC .... B64C 7/00; B64C 9/02; B64C 3/14; B64C 5/10; B64C 1/00; B64C 27/00;
(Continued)

(56) References Cited

U.S. PATENT DOCUMENTS 5,222,692 A       6/1993   Glowacki
7,611,099 B2 *   11/2009   Kordel ...................... B64C 7/00
                                                                244/215
(Continued)

FOREIGN PATENT DOCUMENTS

CN      105570461       5/2016
EP       0489653        6/1992
(Continued)

OTHER PUBLICATIONS

Combined Search and Examination Report for GB1807306.4 dated Nov. 5, 2018, 6 pages.
(Continued)

*Primary Examiner* — Richard R. Green
*Assistant Examiner* — Steven J Shur
(74) *Attorney, Agent, or Firm* — Nixon & Vanderhye P.C.

(57) ABSTRACT

A seal plate (201) for maintaining a continuous aerodynamic surface between a fixed part (302) of an aerostructure such as an aerofoil (103) and a movable surface such as a spoiler (304) is provided. The seal plate (201) includes a resilient material such as fiberglass and has an aerodynamic surface (203). It is configured to be mounted to the fixed part (302) of the aerofoil along one edge (205) and to slidably seal with the control surface (304) at a second edge (207). The seal plate (201) is stepped and has a rigid lever (217) to engage behind the control surface (304) to bend the seal plate precisely according to movement of the control surface (304) and maintain the continuous aerodynamic surface.

23 Claims, 3 Drawing Sheets

(51) Int. Cl.
*B64C 3/14* (2006.01)
*B64C 5/10* (2006.01)
*F16J 15/02* (2006.01)

(58) Field of Classification Search
CPC .... B64C 3/26; B64C 1/26; B64C 3/58; B64C 3/50; B64C 9/00; B64C 21/00; B64C 9/18; B64C 3/44; B64C 9/08; B29C 70/00
See application file for complete search history.

(56) References Cited

U.S. PATENT DOCUMENTS

2006/0145012 A1 7/2006 Hernandez
2006/0249627 A1* 11/2006 Martin Hernandez ... B64C 7/00
 244/130
2011/0133411 A1 6/2011 Wildman et al.

FOREIGN PATENT DOCUMENTS

EP 3181446 6/2017
GB 2545431 6/2017

OTHER PUBLICATIONS

European Search Report cited in 18214930.2 dated Apr. 16, 2019, 13 pages.

* cited by examiner

SEAL PLATE FOR AN AERODYNAMIC SURFACE

RELATED APPLICATION

This application claims priority to United Kingdom Patent Application GB1721568.2 filed Dec. 21, 2017, and to United Kingdom Patent Application GB1807306.4 filed May 3, 2018, wherein the entire contents both of these applications are incorporated by reference.

FIELD OF THE INVENTION

The present invention relates to a seal plate for an aerodynamic surface defined on an aerostructure such as an aerofoil or an aircraft fuselage, in order to provide an aerodynamic seal between a fixed part of the aerostructure, and a movable surface such as a control surface for the aerofoil.

BACKGROUND TO THE INVENTION

It will be understood that the term "control surface" is a term of art, in the aerospace industry, and is used to describe movable structures attached to a fixed part of the wing/aerofoil which control the aerodynamic flow over the wing. Thus, the terms "control surface" and "movable surface" are herein used to describe the movable structures upon which aerodynamic flow control surfaces are formed. Such control surfaces include wing leading edge slats and droop leading edges, trailing edge flaps, ailerons and spoilers.

It is known to provide a flexible seal plate made of resilient material to extend between a fixed part of an aerostructure such as an aerofoil and a movable element, for example a control surface, such as a spoiler. Such an arrangement enables a continuous aerodynamic surface to be maintained across the fixed part, the seal plate and the control surface, during movement of the control surface.

Such seal plates are typically mounted to the fixed part of the aerofoil and extend forwardly or rearwardly therefrom to a free edge of the seal plate which slidably contacts a respective rearward or forward rotating edge of the control surface. This arrangement allows an aerodynamic seal to be maintained whilst the control surface rotates in relation to the fixed part of the aerofoil.

A control surface may not only rotate about the edge slidably contacted by the free edge of the seal plate but it may translate upwardly or downwardly as well.

Spoilers, for example, can "droop" when the aerofoil is in a high lift configuration where the leading edge will typically rotate and also translate horizontally and vertically to maintain contact with a trailing edge flap. If an aerodynamic seal is to be maintained between the seal plate and such a moving control surface, the free edge of the seal plate must at least be able to move up and down with the control surface.

The flexible nature of the seal plate, which may be metallic, or more often glass or carbon fibre reinforced composite material, will allow such limited flexible movement. A bending moment on the seal plate, to cause such movement, is most easily provided by contact with the control surface.

It is known to provide a flexible seal on the free edge of the seal plate which contacts a rotating edge of the control surface but which also contacts the control surface such that downward movement of the control surface acts through the flexible seal to bend the free edge of the seal plate downwards.

In order to maintain a smooth aerodynamic transition between the free edge of the seal plate and the control surface during such droop movement it is necessary for the flexible seal to be very carefully designed and positioned, in relation to the edge of the control surface, such that aerodynamic surfaces of the seal plate and control surface remain aligned.

Owing to the dimensional variations in positioning of the fixed part of the aerofoil and the control surface, it has not been possible to design a flexible seal for the seal plate which will provide the necessary flexibility to continuously seal with the control surface while at the same time maintaining the correct dimensional relationship with the control surface to preserve the continuous aerodynamic surface.

It is an object of the invention to provide a seal plate which will overcome some of the difficulties with the prior art.

SUMMARY OF THE INVENTION

According to a first aspect of the invention, there is provided a seal plate for maintaining a continuous aerodynamic surface between a fixed part of an aerodynamic structure and a movable surface, the seal plate comprising a first resilient material and defining a said aerodynamic surface thereon and being configured to be mounted to the fixed part along a first edge thereof and slidably to engage the movable surface at a second distal edge, the distal edge defining a sealing surface, sealably to contact the movable surface, and a rigid lever to transfer a bending moment from the movable surface to the seal plate whereby to bend the seal plate in precise correspondence with movement of the movable surface and maintain the said continuous aerodynamic surface, the seal plate defining a step whereby the rigid lever is stepped away from the aerodynamic surface slidably to engage behind the movable surface.

This arrangement separates the functions of sealing the seal plate to the movable surface and applying a bending moment to the seal plate from the movable surface. Far more precise relative positioning of the distal edge of the seal plate and the movable surface in contact therewith is possible because the rigid lever is now used to position the seal plate relative to the movable surface, during movement, and not the sealing surface which may have a degree of flexibility or "give" in it potentially leading to lack of control in maintaining the continuous aerodynamic surface. In addition, the stepped form of the seal plate whereby the rigid lever engages behind the movable surface, away from the aerodynamic surface, provides a neat and aerodynamically efficient way of causing the seal plate accurately to move with the movable surface, while in sealing engagement therewith.

In a preferred embodiment the fixed part of the aerodynamic structure comprises a fixed part of an aerofoil and the movable surface comprises a control surface for the aerofoil, for example a spoiler which may be droopable.

The sealing surface may be formed on a flexible seal whereby to help ensure that an efficient seal is maintained between the seal plate and the movable surface during relative movement therebetween. Such a flexible seal will alleviate the need to form the sealing surface precisely to follow movement of the movable surface thereagainst, during relative movement of the seal plate and movable surface.

The sealing surface may form a transition between the aerodynamic surface and the stepped rigid lever and may extend generally in a direction of relative movement between the movable surface and the seal plate, when assembled, whereby to maintain sealing contact during the relative movement. This design helps to ensure that a relatively constant sealing pressure exists between the seal plate and movable surface.

The choice of material for the seal will depend upon the environment in which the seal plate is to operate and the particular application. Thus, the first resilient material may suitably comprise fibre reinforced composite material, such as glass or carbon fibre reinforced composite, or may comprise a polyether ether ketone (PEEK) polymer or may be metallic.

The seal may comprise a core of a second resilient material, preferably of rubber-like consistency such as silicon. Whether or not the sealing surface is formed on a flexible seal, the sealing surface may be covered by a fabric. The fabric preferably comprises a low friction material, such as polyester.

In order to provide a cohesive structure which is convenient to manufacture and is likely to be reliable in service, the fibre reinforced composite material, the second resilient material of the core, if used, and the fabric cover are preferably co-cured together to form a co-cured integral structure.

According to a second aspect of the invention there is provided an aerostructure assembly comprising a fixed part of the aerostructure, a seal plate according to the first aspect attached thereto and a movable surface in sealable engagement with the seal plate.

In a preferred embodiment, the aerostructure comprises an aerofoil and the movable surface comprises a control surface for the aerofoil.

Such a control surface of a said aerofoil may comprise a droopable spoiler with a first position thereof representing a cruise configuration for the aerofoil, a second drooped position representing a high lift configuration for the aerofoil and a third raised position being operable to spoil lift of the aerofoil.

The movable surface may define a second sealing surface at one edge thereof to engage the sealing surface of the seal plate. The second sealing surface may be formed on a flexible seal, either in substitution for, or in addition to, the flexible seal on the seal plate.

The movable surface may define a deflection surface on a side oppose to its aerodynamic surface to engage the lever of the seal plate whereby to apply the bending moment to the seal plate. And the deflection surface of the movable surface may depend from the second sealing surface thereof at an angle thereto.

The sealing surface of the seal plate may extend at an angle to the aerodynamic surface and depend therefrom and the lever may define a surface depending from the sealing surface in a direction generally parallel to the aerodynamic surface.

Where the aerostructure is an aerofoil, the control surface may comprise any aerofoil flight control surface which operates adjacent a fixed part of the aerofoil, for example a droop leading edge, a leading edge slat, an aileron, a flap or a spoiler. For other aerostructures, the movable surface may comprise a door, a hatch, a flap or a window.

According to a third aspect of the present invention there is provided an aerostructure including an aerostructure assembly according to the second aspect.

BRIEF DESCRIPTION OF THE DRAWINGS

The invention will now be described, by way of example only, with reference to the following drawings in which.

DETAILED DESCRIPTION OF THE INVENTION

Figure 1:
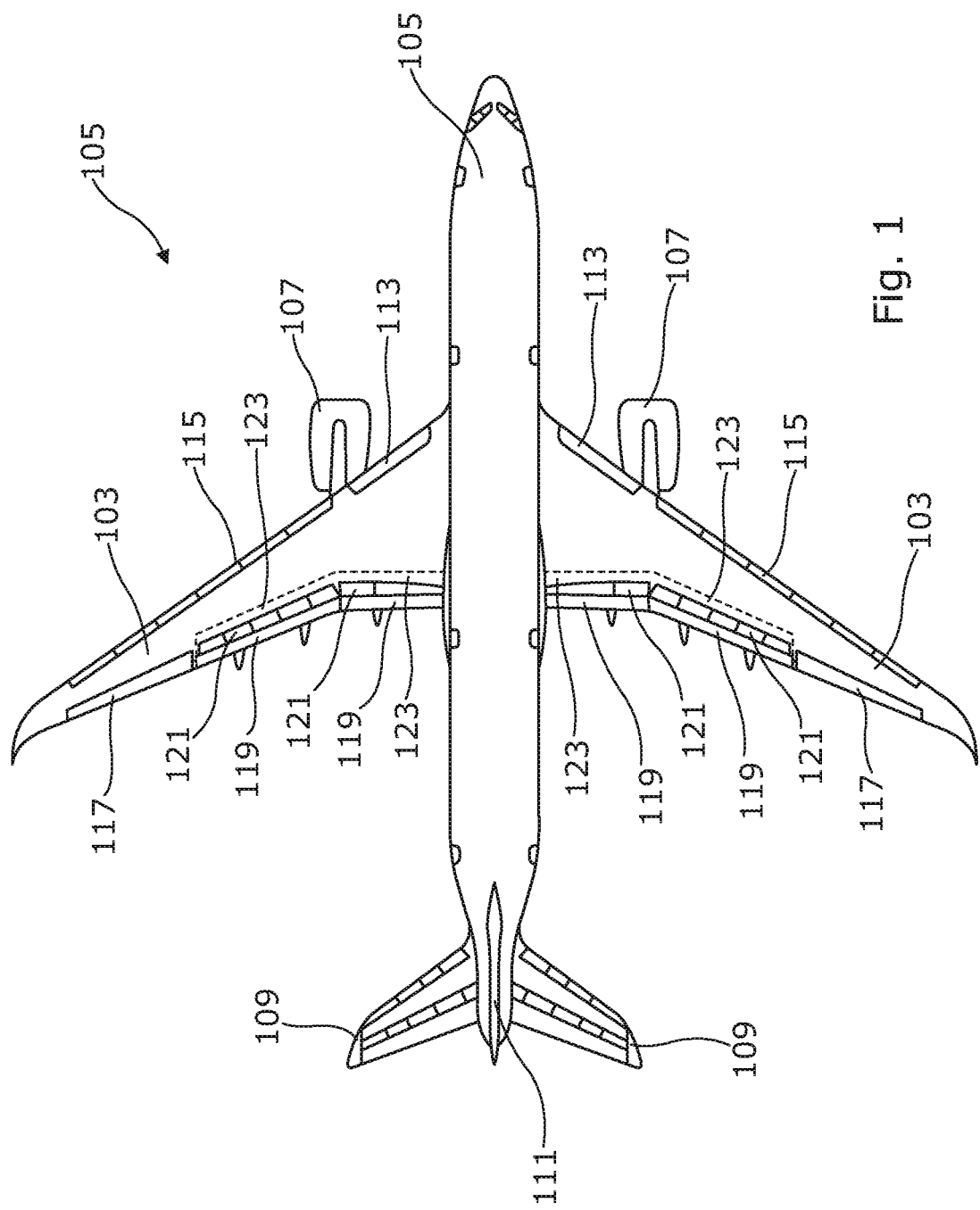
FIG. 1 is a top plan view of a commercial aircraft, showing the layout of high lift devices and spoilers on wings of the aircraft.

Referring to FIG. 1, an aircraft 101 comprises a pair of fixed aerofoils in the form of wings 103 faired into a fuselage 105. The wings 103 each carry an engine 107. The aircraft further comprises horizontal stabilizers 109 and a vertical tail plane 111 each attached at the rear of the fuselage 105. Each of the wings 103 is provided with a set of control surfaces 113, 115, 117, 119, 121 in the form of droop leading edges 113, leading edge slats 115, ailerons 117, inner and outer flaps 119 and spoilers 121. According to the present invention, the trailing edge of each wing 103 in the spanwise region adjacent the spoilers 121 comprises a set of seal plates 123 that are arranged to be resiliently movable upwardly and downwardly with reference to a main plane of the wing 103, as described in further detail below.

Figure 2:
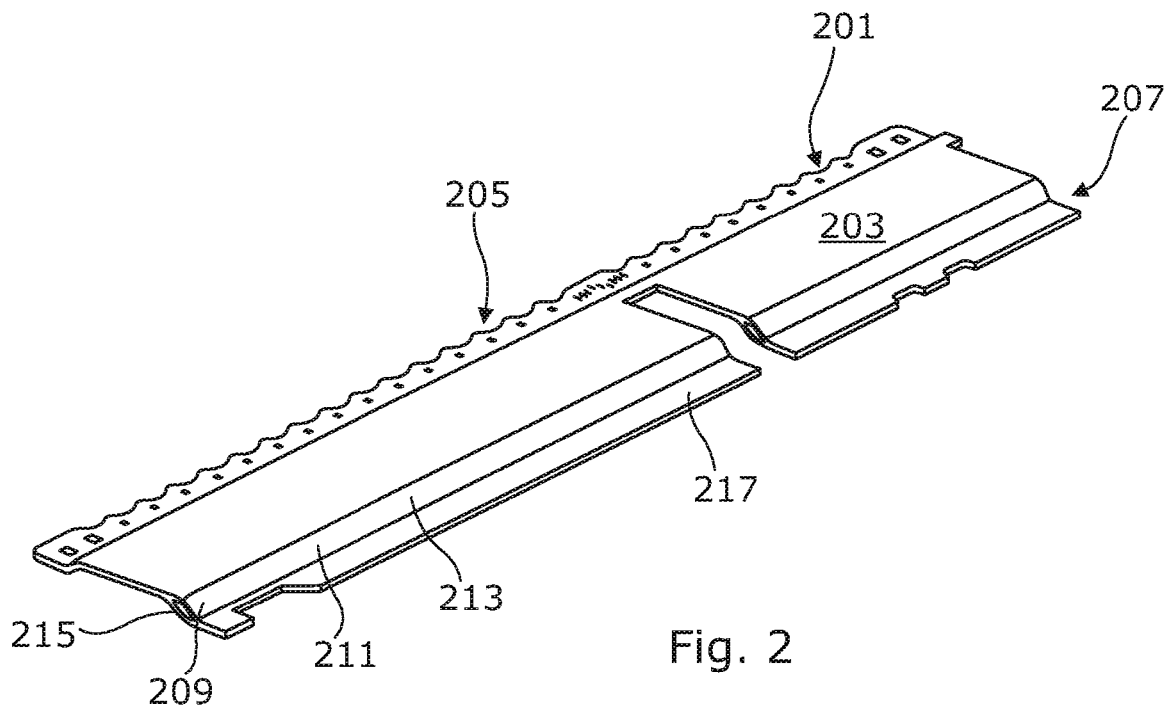
FIG. 2 is an isometric view from above of a seal plate according to the invention.

Referring to FIG. 2, a seal plate 201 according to the invention is shown. The seal plate defines an aerodynamic surface 203 thereon and has a first leading edge 205 and a second distal edge 207. The seal plate 201 is fabricated from glass fibre reinforced composite material which is sufficiently resilient to allow a small amount of bending movement of the seal plate when required. This aspect will be discussed in further detail below.

The leading edge 205 of the seal plate 201 is attached to a fixed part 302 of the aerofoil (see FIG. 3) by fasteners 301. The distal edge 207 has a resilient seal 209 with a sealing surface 211. The seal 209 comprises silicon, to provide the required deformability, and the silicon is covered with a layer of polyester fabric 213 for its wear resistance and friction properties. The seal 209 and fabric 213 are co-cured in place on a fiberglass composite layup for the seal plate 201. This method is faster than separately curing a layup for the seal plate 201 and then applying the seal 209 and fabric layer 213 by adhesive to the cured layup. It also results in a stronger structure in which the seal 209 is less likely to become detached from the seal plate 201.

The seal 209 is formed on an angled transition portion 215 of the seal plate 201 which depends at an acute angle from the portion of the seal plate defining the aerodynamic surface 203. Depending from the transition portion 215, stepped away from and running generally parallel with the aerodynamic surface 203, is a rigid lever in the form of a flange 217 of the seal plate 1. Thus, the seal plate 1 defines a step whereby the sealing surface 211 forms a transition between the aerodynamic surface 203 and the stepped rigid lever or flange 217.

The seal plate shown has various cutouts which are required for installation in an aerofoil.

Like components throughout have been given the same reference numerals, for ease of understanding.

Figure 4:
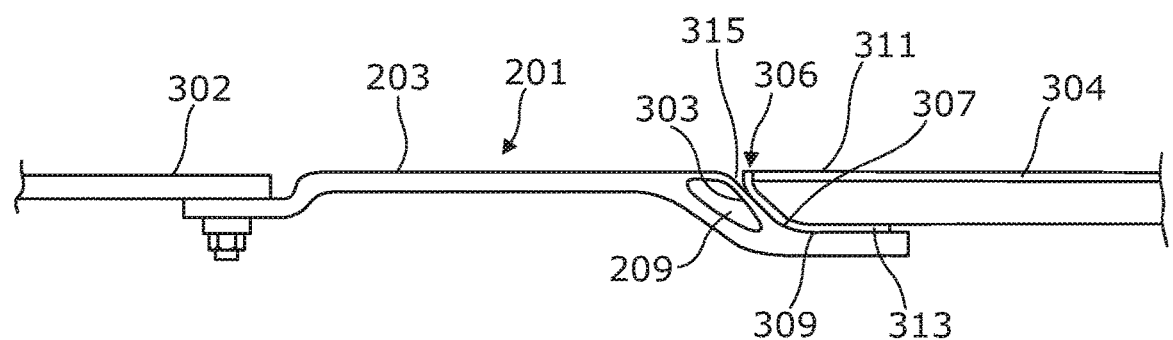
FIG. 4 is a side view of the assembly of FIG. 3.
Figure 3:
FIG. 3 is an isometric detail view from one side of an aerofoil assembly according to the invention with the aerofoil in a cruise configuration.

Referring to FIGS. 3 and 4, a seal plate assembly/aerofoil assembly according to the invention is shown. Here, a seal plate 201 is attached by fasteners 301 to a fixed part of an aerofoil in the form of a fixed structure 302 attached to a rear spar (not shown) of a wing. In sealing contact with the sealing surface 211 of the seal plate seal 209 is a second sealing surface 303 of a control surface in the form of a wing spoiler 304. The spoiler 304 defines an upper aerodynamic surface 305 on a skin 311 thereof and, in combination with the seal plate 201 and the fixed structure 302, a continuous aerodynamic surface is formed across the fixed structure, the seal plate and the spoiler.

From a leading edge 306 of the spoiler 304, the second sealing surface 303 is formed on a plate 313 depending downwardly at an angle to the aerodynamic surface 305. From a lower edge 307 of the second sealing surface 303 on the plate 313 the plate extends further and defines a deflection surface 309 thereon. The deflection surface 309 extends generally parallel with the aerodynamic surface 305, in sliding contact with the flange 217. It will be seen that the stepped configuration of the seal plate 1 allows a smooth continuation of the aerodynamic surface 203, 305 across a join 315 between the seal plate 1 and spoiler 304 while at the same time enabling the lever or flange 217 to slidably engage behind the spoiler, out of the airflow across the aerodynamic surfaces. Thus, the bending moment can be transferred between the spoiler 217 and seal plate 1 without affecting the airflow over the assembly.

Figure 5:
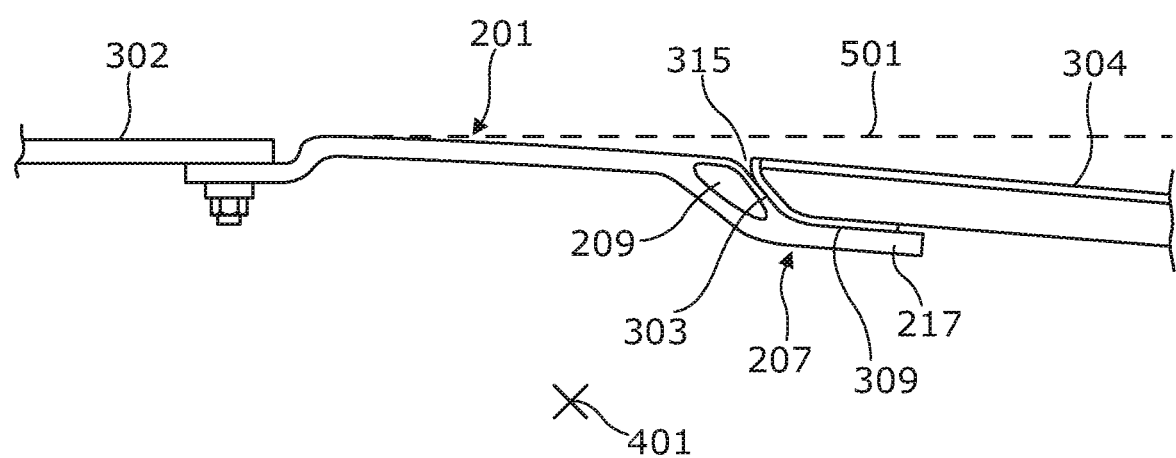
FIG. 5 shows the assembly of FIG. 4 in a droop configuration with a surface corresponding to an aerodynamic cruise configuration shown in ghosted outline.

Referring to FIG. 5, the spoiler 304 is arranged to droop downwardly in a high lift configuration for the wing, in order to form a smooth continuous aerodynamic surface with trailing edge flaps or ailerons (not shown) located aft of the spoiler. The drooping movement occurs with a rotary action of the spoiler 304 about pivot 401. The spoiler 304 and seal plate 201 are shown in the droop configuration with the cruise aerodynamic surface indicated with a dotted line 501. Not only has the spoiler 304 rotated about pivot 401 and moved downwardly but the distal edge 207 of the seal plate 201 has also been moved down by the deflection surface 309 acting on the flange 217 and pressing the flange downwards. It will be observed that the seal 209 and the sealing surface 303 of the spoiler have moved apart slightly. However, owing to the resilience of the seal 209, it has expended towards the sealing surface 303 and is still in sealing contact therewith.

With the spoiler 304 in its drooped high lift configuration, and with the spoiler having moved the seal plate downwardly, it will be observed that a continuous aerodynamic surface 501 still exists across the surfaces 203 and 305 and that the join 315 has not widened significantly. The seal plate and assembly of the invention therefore allow the seal to have the necessary flexibility and resilience to create an effective seal in both cruise and high lift configurations at the same time as the precise relationship of the lever and deflector allow the seal plate and control surface to maintain a continuous aerodynamic surface in both configurations.

The embodiments described herein are respective non-limiting examples of how the present invention and aspects of the present invention may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

The word "or" as used herein is to be taken to mean "and/or" unless explicitly stated otherwise.

The invention claimed is:

1. A seal plate for maintaining a continuous aerodynamic surface between a fixed part of an aerodynamic structure and a movable surface, the seal plate comprising:
   a first resilient material and defining said continuous aerodynamic surface thereon and being configured to be mounted to the fixed part along a first edge thereof and slidably to engage the movable surface at a second distal edge,
   the second distal edge defining a sealing surface configured to sealably contact the movable surface, and
   a rigid lever configured to transfer a bending moment from the movable surface to the seal plate whereby the bending moment bends the seal plate in correspondence with movement of the movable surface and maintains the continuous aerodynamic surface,
   wherein the seal plate includes a step which steps the rigid lever from the continuous aerodynamic surface such that the rigid lever slidably engages a side of the movable surface opposite to an aerodynamic surface of the moveable surface,
   wherein the first resilient material, the second distal edge, rigid lever and step are a single piece device.

2. The seal plate according to claim 1, in which the sealing surface forms a transition between the continuous aerodynamic surface and the rigid lever.

3. The seal plate according to claim 1, in which the sealing surface is formed on a flexible seal.

4. The seal plate according to claim 1, in which the sealing surface extends in a direction of relative movement between the movable surface and the seal plate.

5. The seal plate according to any claim 1, in which the first resilient material comprises fibre reinforced composite material.

6. The seal plate according to claim 3, in which the flexible seal comprises a core of a second resilient material.

7. The seal plate according to claim 6, in which the second resilient material is of rubber-like consistency.

8. The seal plate according claim 1, in which the sealing surface is covered by a fabric.

9. The seal plate according to claim 8, in which the fabric comprises a low friction material.

10. The seal plate according to claim 3, wherein the fibre reinforced composite material, the second resilient material of the core and a fabric cover form a co-cured single-piece structure.

11. An aerofoil assembly comprising:
   a fixed part having a first aerodynamic surface;
   a moveable control surface mounted to the fixed part and having a second aerodynamic surface;
   a seal plate including:
      a first resilient material having a third aerodynamic surface extending between the first and second aerodynamic surfaces, wherein the first resilient material includes a first edge mounted to the fixed part and a second edge, opposite to the first edge, slidably engaging the movable control surface;
      the second edge defining a sealing surface configured to sealably contact the movable control surface,
      a rigid lever configured to transfer a bending moment from the movable control surface to the seal plate whereby the bending moment bends the seal plate, and
      a step at the second edge and between the rigid lever and the first resilient material, wherein the step offsets the rigid lever from the third aerodynamic surface and slidably engages a side of the movable control surface opposite to the second aerodynamic surface, wherein the first resilient member, the second edge, the rigid lever and the step are a single piece device.

12. The aerofoil assembly according to claim 11, in which the moveable control surface defines a second sealing surface at one edge thereof to engage the sealing surface of the seal plate.

13. The aerofoil assembly according to claim 11, in which the moveable control surface defines a deflection surface opposed to the second aerodynamic surface, and the deflection surface slidably engages the rigid lever of the seal plate.

14. The aerofoil assembly according to claim 13, in which the deflection surface depends from the second sealing surface at an angle thereto.

15. The aerofoil assembly according to claim 11, in which the moveable surface comprises a spoiler.

16. An aerofoil including the aerofoil assembly according to claim 11.

17. The aerofoil according to claim 16, in which the control surface comprises a droopable spoiler with a first position thereof representing a cruise configuration for the aerofoil and a second position representing a high lift configuration for the aerofoil.

18. An airfoil assembly comprising:
a fixed wing having a first aerodynamic surface and a trailing edge;
a seal plate including a leading edge region fixed to the trailing edge of the fixed wing, a resilient panel extending in a chordwise direction back from the leading edge region, and a rigid lever extending back in the chordwise direction from the resilient panel; and
a moveable spoiler including a leading edge, a third aerodynamic surface extending from the leading edge of the spoiler in the chordwise direction and an underside surface opposite to the third aerodynamic surface;
wherein the resilient panel includes a second aerodynamic surface aligned with the first and third aerodynamic surfaces along the chordwise direction;
wherein the rigid lever is joined to a trailing edge of the resilient panel by a step which joins the rigid lever to the resilient panel;
wherein the step offsets the rigid lever out of a plane of the second aerodynamic surface;
wherein the rigid lever slidably engages the underside surface of the spoiler such that the engagement bends the resilient panel, and
wherein the seal plate is a single piece device including the leading edge, the resilient panel, the rigid lever and the step.

19. The airfoil assembly of claim 18, wherein the leading edge region of the seal plate is a strip extending the length of the seal plate and is fixed to an underside surface of the fixed wing, wherein the strip is stepped from the second aerodynamic surface by a distance commensurate with a thickness of the trailing edge of the fixed wing.

20. The airfoil assembly of claim 18, wherein the seal plate forms a cantilevered plate fixed to the fixed wing and bendable in the chordwise direction by the spoiler.

21. The airfoil assembly of claim 18, further comprising a flexible seal attached to or incorporated in the step of the seal plate, wherein the flexible seal extends the length of the step and abuts the leading edge of the spoiler.

22. The airfoil assembly of claim 18, wherein the first, second and third aerodynamic surfaces form a continuous aerodynamic surface.

23. The airfoil assembly of claim 22, wherein the continuous aerodynamic surface includes a first recess formed by a first gap between the first and second aerodynamic surfaces, and a second gap between the second and third aerodynamic surfaces.

* * * * *